(12) United States Patent
Patel

(10) Patent No.: US 6,579,583 B2
(45) Date of Patent: Jun. 17, 2003

(54) STORAGE CONTAINER FOR PLATELETS AND THE LIKE

(75) Inventor: Indrajit Patel, Algonquin, IL (US)

(73) Assignee: Baxter International Inc., Deerfield, IL (US)

(*) Notice: Subject to any disclaimer, the term of this patent is extended or adjusted under 35 U.S.C. 154(b) by 0 days.

(21) Appl. No.: 09/991,826

(22) Filed: Nov. 13, 2001

(65) Prior Publication Data

US 2002/0122904 A1 Sep. 5, 2002

Related U.S. Application Data

(63) Continuation of application No. 08/824,585, filed on Mar. 26, 1997, now abandoned, which is a continuation of application No. 08/343,303, filed on Nov. 22, 1994, now abandoned.

(51) Int. Cl.[7] .......................... B32B 27/08; B32B 27/18; B32B 27/28; B32B 27/32; A61B 19/00
(52) U.S. Cl. ................... 428/35.5; 428/35.2; 428/35.7; 428/36.8; 428/515; 428/516; 428/517; 428/519; 428/520; 428/521; 428/522; 428/523; 525/80; 525/88; 525/95; 525/222; 422/40; 422/41; 422/102; 604/262; 604/403; 604/408
(58) Field of Search .............................. 428/35.2, 35.5, 428/35.7, 36.8, 515, 516, 523, 517, 519, 520, 521, 522; 525/80, 98, 222, 227, 88, 90, 93, 94, 95; 422/40, 41, 102; 604/262, 408, 410, 403

(56) References Cited

U.S. PATENT DOCUMENTS

| | | | |
|---|---|---|---|
| 4,112,989 A | | 9/1978 | Grode et al. |
| 4,140,162 A | * | 2/1979 | Gajewski et al. .............. 150/1 |
| 4,453,940 A | | 6/1984 | Aoyagi et al. |
| 4,561,110 A | | 12/1985 | Herbert |
| 4,588,401 A | | 5/1986 | Kilkson |
| 5,026,347 A | | 6/1991 | Patel |
| 5,274,035 A | * | 12/1993 | Chundury ..................... 525/92 |
| 5,320,899 A | * | 6/1994 | Djiauw ........................ 428/220 |

FOREIGN PATENT DOCUMENTS

| | | |
|---|---|---|
| DE | 28 00 484 C3 | 1/1978 |
| DE | 33 05 365 A1 | 2/1983 |
| EP | 0 074 178 B1 | 8/1982 |
| EP | 0 083 778 A2 | 12/1982 |
| EP | 0 310 143 A1 | 7/1985 |
| EP | 0 229 184 A1 | 6/1986 |
| EP | 0 216 509 A2 | 8/1986 |
| EP | 0 216 639 A2 | 9/1986 |
| GB | 1 527 685 | 11/1975 |
| GB | 2 001 657 A | 7/1978 |
| GB | 2 111 944 A | 12/1981 |
| GB | 2 146 614 B | 9/1983 |
| WO | WO 84/01291 | 6/1983 |
| WO | WO 86/02042 | 9/1985 |

OTHER PUBLICATIONS

Article entitled: "Ethylene/vinyl acetate copolymer containers," Baxter Travenol Laboratories, Inc., May 30, 1978, addition to 1527685 Headings C3V and C3W.

* cited by examiner

*Primary Examiner*—Vivian Chen
(74) *Attorney, Agent, or Firm*—Bradford R. L. Price; Michael C. Mayo; Robert M. Barrett

(57) ABSTRACT

The invention provides a flexible plastic formulation capable of being extruded, blow-molded, ethylene oxide and radiation sterilized. The plastic formulation of the invention comprises: a) from about 60 to about 94 percent by weight of a copolymer consisting essentially of ethylene and vinyl acetate units; b) from about 5 to about 25 percent by weight of a block copolymer, the block copolymer consisting essentially of a central block copolymer molecule including generally equal proportions of ethylene and butylene units, and terminal blocks of polystyrene; and c) from about 1 to about 15 percent by weight of an ultra-low density polyethylene material. The plastic formulations of the invention are useful in the manufacture of blood bags, tubing and the like.

6 Claims, 1 Drawing Sheet

STORAGE CONTAINER FOR PLATELETS AND THE LIKE

This application is a continuation of U.S. Ser. No. 08/824,585, filed Mar. 26, 1997, abandoned, which is a continuation of U.S. Ser. No. 08/343,303, filed Nov. 22, 1994, abandoned.

BACKGROUND OF THE INVENTION

1. Field of the Invention

The invention generally relates to plastic formulations. More particularly, the invention relates to medical grade plastic formulations suited for contact with human blood and its components.

2. Description of the Prior Art

Most whole blood collected is not stored and used for transfusion. Instead, the whole blood is separated into its therapeutically proven components, which are themselves stored in plastic containers. These therapeutic blood components of whole blood include red blood cells, platelets, and numerous other plasma-based fractions, such as albumen, plasma protein fraction, gamma globulen, and factor VIII.

Patient care is improved by providing only the therapeutic blood components of whole blood which are required to treat the specific disease. The demand for the therapeutic blood components of whole blood is thus ever-increasing. Likewise, the demand for safe and effective systems and methods for collecting, separating, and storing the therapeutic components of whole blood is growing.

Typically, whole blood and its components are collected and stored in containers made of medical grade plastic formulations, such as polyvinyl chloride (PVC) plastic formulations. These PVC formulations must, by necessity, include a plasticizer, because PVC is not itself flexible enough for use in these containers. Plasticizers are known to leach, or extract, into the blood components which are stored in PVC containers. While there are no known adverse physiological results which are linked to the leaching of plasticizers into the blood components, it is of course, desirable to minimize, as much as possible, the contact between blood components and any material not normally found in the human body.

PVC formulations also must, by necessity, include a heat stabilizer to prevent the PVC from undergoing heat degradation and color change during and after processing. Like plasticizers, heat stabilizers may also leach into the blood components. PVC plastic formulations including plasticizer and heat stabilization systems are described for example in U.S. Pat. No. 4,505,708.

Another important characteristic of blood component storage containers is gas-permeability. Gas permeability is essential so that the living cells of the blood component, such as red blood cells and platelets, can exchange oxygen and carbon dioxide. This allows for the extended viability of the living blood component and longer storage times. With regard to PVC plastic formulations, as the amount of plasticizer decreases, gas permeability generally decreases. Reduced gas permeability is not optimal for the storage of certain blood components, such as platelets.

As a result of the problems and shortcomings of PVC plastic formulations, several efforts have been made to develop plastic material suitable for storing blood components from non-PVC plastics. These materials include flexible polyesters and polyolefins. Surprisingly, many of the materials tested, while giving indications of being good plastic materials for the manufacturer of blood bags, have caused blood stored in the containers to exhibit an undesirably high plasma hemoglobin content. This indicates that the lysis rate of the red blood cells in these containers is high. Examples of blood bags made from plastic formulations other than PVC are disclosed in U.S. Pat. Nos. 4,112,982; 4,140,162; 4,301,800; 4,479,989; and 5,026,347. Several of these patents also disclose additional components to reduce the lysis of red blood cells, such as, citrate esters, and antihemolytic plasticizers incorporated into plastic inserts.

Sterilization of the blood component storage container is also of great importance. The containers should be preferably sterilizable by ethylene oxide, and/or radiation sterilization, such as gamma radiation sterilization. U.S. Pat. No. 4,479,989 discloses that, although plastic formulations including polypropylene are heat-sterilizable, they are undesirable since they may not be radiation-sterilized.

Furthermore, plastic formulations should remain flexible at low temperatures during storage. Plastic materials including polypropylene homopolymers, or copolymers, or blends thereof, are disclosed as brittle at low temperatures and inherently stiff. This is, of course, a disadvantage.

It would, therefore, be advantageous to provide a plastic formulation which can be formed by extrusion and/or blow molding to provide a medical fluid container which has a flexible, collapsible film body with good low temperature flexibility, sufficient temperature resistance to softening and/or melting, radiation and gas sterilizable, and sufficient gas-permeability to provide for the viability of the living blood components or other cellular matter therein. It would also be advantageous if the container had superior optical clarity and a combination of flexibility and strength which, imparts superior handling characteristics over a wide temperature range.

SUMMARY OF THE INVENTION

One aspect of the invention provides a flexible plastic formulation capable of being extruded and blow-molded, and radiation sterilized. The plastic formulation includes: a) from about 60 to about 94 percent by weight of a copolymer consisting essentially of ethylene and vinyl acetate units; b) from about 5 to about 25 percent by weight of a block copolymer, the block copolymer consisting essentially of: a central block of a copolymer molecule including generally equal proportions of ethylene and butylene units, and terminal blocks of polystyrene; and c) from about 1.0 to about 15 percent by weight of an ultra-low density polyethylene material.

Another aspect of the invention provides a flexible, collapsible container capable of being extruded and/or blow-molded, and radiation-sterilized, which is made from the plastic formulation of the invention.

A still further aspect of the invention is directed to a method of storing blood components, such as packed red blood cells or platelets, in a container made from the plastic material of the invention.

DESCRIPTION OF THE PREFERRED EMBODIMENTS

Figure 1:
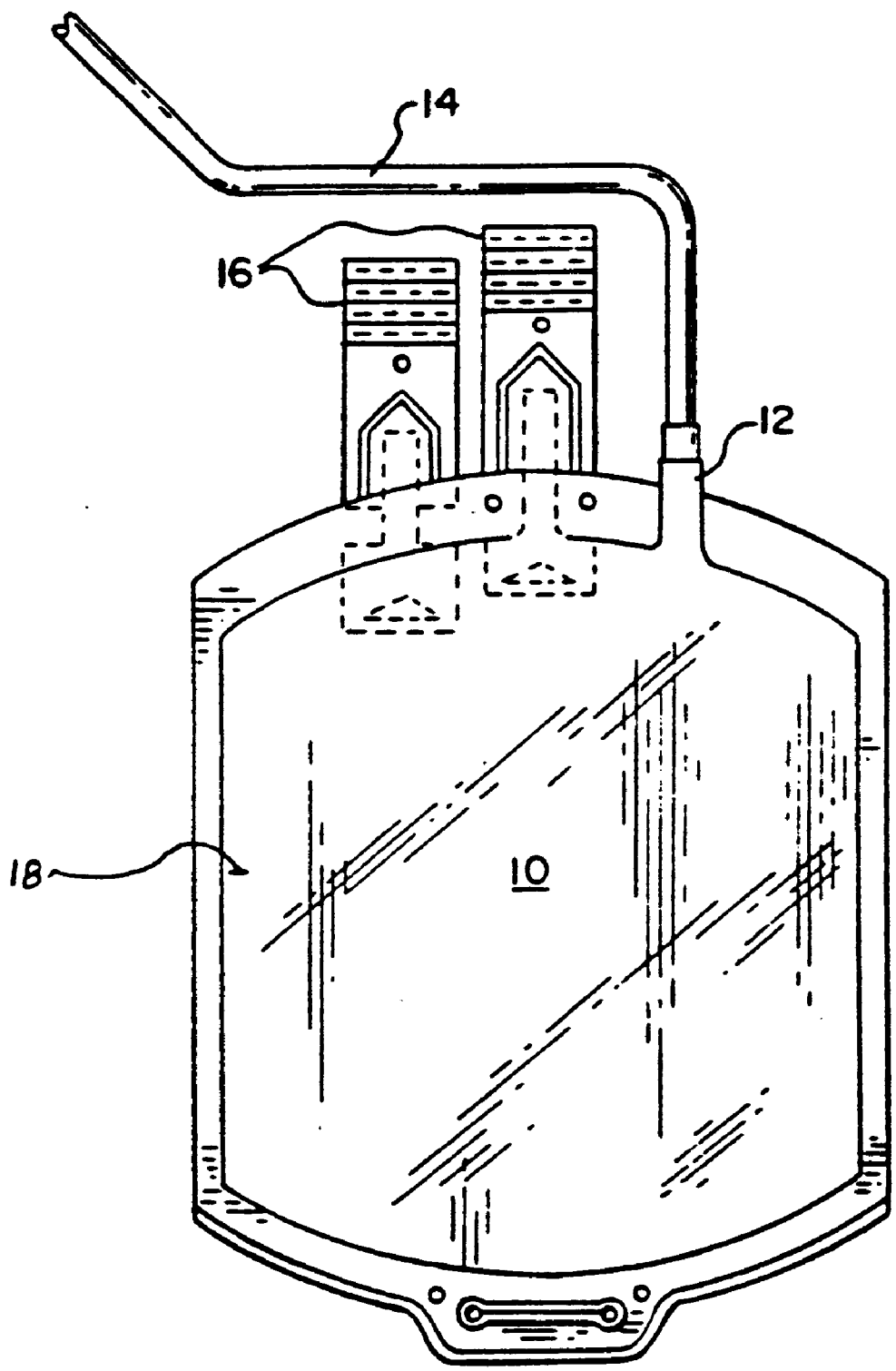
FIG. 1 is a planned view of a blood component container which is made of a plastic formulation which embodies the features of the invention.

The present invention provides a flexible plastic formulation and method for making and using such a plastic formulation. The plastic formulations of the invention are preferably used to make flexible, collapsible containers, such as plastic blood bags, tubing and the like, as well as for medical solution containers. It is also contemplated that the plastic formulations of the invention can be used generally in other flexible containers and objects of various kinds since the invention provides the advantages of being extrudable and blow-moldable, having good low temperature brittleness, and being gas and radiation-sterilizable. A further, and very important advantage of the invention is that blood containing bags manufactured from the plastic formulations of the invention exhibit superior gas permeability.

The plastic materials of the present invention are soft and flexible over a wide temperature range. Also, plastic formulations of the invention are preferably essentially free of liquid plasticizers, heat stabilizers and anti-hemolytic additives. Accordingly, when used, for example, to fabricate blood bags, a very low level of leaching materials from the plastic into the blood is achieved. In accordance with the invention, a flexible plastic formulation is provided, such plastic being capable of being extruded and/or blow molded, into a flexible, collapsible container which is radiation sterilizable.

The plastic formulations of the present invention preferably include three ingredients. The first ingredient is a copolymer consisting essentially of ethylene and vinyl acetate units. The second ingredient is a block copolymer. The block copolymer consists essentially of a central block copolymer molecule and terminal polymer blocks. The central copolymer molecule includes generally equal proportions of ethylene and butylene units, and the terminal polymer blocks are polystyrene (SEBS). The third ingredient is an ultra-low density polyethylene material. The ingredients which are used to make the plastic formulations of the inventions are intimately admixed using conventional plastic blending techniques and are extruded and/or blow molded into thin films, tubing and the like, to construct flexible containers for receiving therein, among other things, blood components.

Referring to the ethylene-vinyl acetate copolymer ingredient (EVA), this copolymer is included in the plastic formulations of the instant invention in an amount of from about 60 to about 94 percent by weight of the plastic formulation. More preferably, this copolymer is included in the plastic formulation in an amount of from about 70 to about 87 percent by weight of the plastic formulation. Most preferably, however, the ethylene-vinyl acetate copolymer is included in the plastic formulation of the invention in an amount of from about 78 to about 82 percent by weight of the plastic formulation.

The ethylene-vinyl acetate copolymer used in the present invention preferably includes from about 18 to about 40 percent by weight vinyl acetate units. More preferably, this copolymer includes from about 22 to about 35 percent by weight vinyl acetate units. Most preferably, however, the copolymer includes from about 25 to about 30 percent by weight vinyl acetate units. One preferred ethylene-vinyl acetate copolymer material is sold under the trade name Ultrathene, product designation UE-634, by Quantum Chemicals, and includes approximately 28 percent by weight vinyl acetate units.

Referring to the block copolymer ingredient, according to one preferred embodiment, the block copolymer ingredient is included in the plastic formulation of the invention in an amount of from about 5.0 to about 25 percent by weight of the plastic formulation. More preferably, the block copolymer is included in an amount of from about 10 to about 20 percent by weight of the plastic formulation. Most preferably, however, the block copolymer is included in the plastic formulations of the invention in the amount of from about 14 to about 18 percent by weight of the plastic formulation.

Especially preferred block copolymer ingredients are commercially available under the trademark name Kraton G, product designation 1652 and 1657, for example, from the Shell Chemical Company. The block copolymer preferably has a molecular weight of from about 50,000 to about 120,000 daltons. More preferably, the block copolymer has a molecular weight of from about 70,000 to about 100,000 daltons. Block copolymer ingredients useful in the present invention are described in U.S. Pat. No. 4,140,162, incorporated by reference herein. It is preferred that the ethylene and butylene copolymer portion of the block polymer comprises from about 50 to about 85 percent by weight of the block copolymer molecule.

Referring to the ultra-low density polyethylene material (ULDPE), for the purpose of this invention, ULDPE shall mean those ethylene/alpha-olefin copolymers having a density of less than about 0.925 g/cm$^3$ and, more preferably, less than about 0.900 g/cm$^3$ or less, and may even be less than 0.800 g/cm$^3$. The ULDPE material is included in plastic formulations in an amount of from about 1.0 to about 15.0 percent by weight of the plastic formulation. More preferably, the ULDPE material is included in an amount of from about 3.0 to about 10.0 percent by weight of the plastic formulation. Most preferably, the ULDPE material is included in an amount of from about 4.0 to 6.0 percent by weight of the plastic formulation. Commercially, preferred ULPDE material is available from Mitsui Petrochemical Inc. under the tradename of Tafmer®, product designation A4085.

Referring to the Figure, FIG. 1 shows a blood component storage container 10, which embodies one aspect of the invention. The container 10 may be variously configured. In the illustrated embodiment, the container 10 includes an inlet 12 to which a length of flexible tubing 14 is integrally connected.

The tubing 14 may include, at its terminal end, a phlebotomy needle (not shown). In this arrangement, the tubing 14 serves to introduce whole blood from a donor into the container 10 for processing and, preferably, storage of certain of the blood components. Preferably, whole blood or at least one blood component is contained within the container. Preferable blood components include platelets, packed red blood cells, plasma and plasma based fractions.

Alternately, the tubing 14 may communicate with the interior of another container, (also not shown) which is made of the plastic formulations of the invention. In this arrangement, the tubing 14 serves to introduce a portion of the contents of the other container into the container 10 for additional processing and, preferably, storage. Also, as illustrated, the container 10 includes a number of normally sealed, selectively openable access ports 16. Access ports 16 and inlet 12 can, in some embodiments, include a co-extruded or laminated layer of PVC (not shown). The inner PVC layer allows solvent bonding of PVC tubing to the inlet 12 of container 10.

In accordance with the invention, the walls 18 of the container 10 are made of the plastic formulations of the present invention and are sealable using heat or radio frequency sealing techniques (RF). Preferably, the plastic formulations of the invention are essentially free of plasticizer, heat stabilizers. Preferably, the walls 18 have a thickness of at least 0.005 inch, and, preferably, from about 0.01 to about 0.02 inch, yet remain flexible and collapsible at room temperature.

The separate ingredients of this invention may be conventionally formulated in the usual polymer blending equipment, for example, the ingredients may be tumble-blended in a ribbon blender. After blending to obtain homogenous mixture, the plastic formulations of the invention may be heated, melted, and extruded using conventional equipment. If it is desired, the material may then be blow molded, or otherwise processed in accordance with conventional techniques to form a suitable container.

The following examples are presented to describe preferred embodiments and utilities of the invention and are not meant to limit the invention unless otherwise stated in the claims appended hereto.

EXAMPLE 1

Gas Permeability Testing of Film

Gas permeability was measured using Oxygen Gas Permeability, ASTM D-398 (N.A.), DIN 53380 (Europe), JIS K-7126 (Asia). The "OX-TRAN" System used was manufactured by Mocon Inc., Minneapolis, Minn. The OX TRAN system utilizes unique sensors for detecting the oxygen transmission rate through flat films. According to the method used, a film specimen was clamped into the diffusion cell and the upper and lower chambers were initially purged with oxygen-free carrier gas to remove residual oxygen from the systems and to desorb oxygen from the sample. The oxygen sensor was then switched into the carrier gas flows. When stable zero was established, oxygen was introduced into the upper diffusion chamber. Molecules of oxygen which diffused through the film into the lower chamber were conveyed by the carrier gas to the sensor. The results obtained are summarized in Table 1 below.

For carbon dioxide gas permeability, the "Permatron-C-Rod" system was used for detecting the carbon dioxide transmission rate through flat films. A film was clamped between the upper and lower halves. Gaseous carbon dioxide was admitted into the upper half while $CO_2$-free nitrogen carrier gas is flushed through the bottom half. A test cycle began when the nitrogen side was automatically switched to the infrared sensor. As molecules of $CO_2$ permeated through the test sample and into the closed loop, the infrared sensor monitors the carbon dioxide transmission rate through the film.

TABLE 1

| Material I.D. | $O_2$ c.c/100 in$^2$/Day | $Co_2$, c.c/100 in$^2$/Day |
|---|---|---|
| (A) | 104 | 520 |
| (B) | 81 | 686 |
| (C) | 77 | 371 |
| (D) | 194 | 1282 |
| (E) | 83 | 425 |
| (F) | 137 | 1304 |

Materials A, B, C, D, F and G are commercially available films used in the construction of platelet storage containers. Material D is a film made of the plastic formulations of the invention constructed as described in Example 4. With regard to $O_2$ diffusion, the film of the invention was far superior to any film tested. Referring to $CO_2$ diffusion, the film of the invention was better than all the films tested except Films C and F. Films B, C and F are PVC-based film. Materials A, B, C and E are PL-732, PL-2209, PL-1240 and PL-269 respectively, available from Baxter Healthcare Corporation. Material E is available from Cobe Corporation.

EXAMPLE 2

Impact Properties

The impact properties (low temperature handling) of one film of the invention was measured using the method described in Applied Science SOP #06KP09-00. The impact properties were measured from −60° C. to 45° C. using an impact velocity of roughly 3 m/sec. and a falling weight of 5.77 kg. The film (H) constructed of the plastic formulation of the invention (see example 4) demonstrated that a failure occured from ductile to brittle near −55° C. The results of the test are summarized in Table 2.

TABLE 2

| Film | Impact/Transition Range** ° C. |
|---|---|
| A | −15 to −10 |
| B | −30 to −25 |
| C | −30 to −25 |
| D | −30 to −25 |
| E | −20 to −10 |
| F | −20 to −10 |
| G | −50 to −60 |

**Range of Brittle/Ductile Transition

Materials A–F are commercially available films used in the construction of platelet storage containers. Material G is a film of the invention constructed as described in Example 4. The film of the present invention demonstrated superior low temperature handling characteristics. This is of great importance since blood components are often frozen at very low temperatures. Materials A–D are, respectively, PL-146, PL-732, PL-1240 and PL-2209, available from Baxter Healthcare Corporation. Material E is Cutter CLX™, from Cutter Inc. Material F is from Kawasumi Corporation. Materials A, C, D, E and F are PVC based materials.

EXAMPLE 3

Platelet Storage Capacity

The data indicated that the platelet storage capacity in a platelet container constructed from the film of the invention (B) is greater than for commercial platelet container (A) (PL-732, Baxter Healthcare Corporation) in 100 ml of plasma.

TABLE 3

Results: Results of Platelet Storage Capacity

| Platelet Capacity & Gas Permeability | (A) 1000 ML Container | (B) 1000 ML Container |
|---|---|---|
| Platelets in 100 ml plasma, 5 days | $3.1 \times 10^{11}$ | $4.2 \times 10^{11}$ |

EXAMPLE 4

Formulation

| Material Description | Concentration, % |
|---|---|
| EVA, UE 634 | 80% |
| SEBS, KRATON G-1652 | 15% |
| ULDPE, TAFMER A-4085 | 5% |

Each component was weighed and blended using a ribbon blender. This blend was pelletized following standard extrusion techniques. The pelletized material was used to extrude a monolayer film. The film thickness was 0.010" to 0.011". The film surface finish was taffeta/matt to prevent panel sticking. The thickness range of the film is preferably from about 0.005" to about 0.02".

Changes can be made in the composition, operation and arrangement of the method of the present invention described herein without departing from the concept and scope of the invention as defined in the following claims:

What is claimed is:

1. A flexible plastic formulation for fabricating a platelet container and which is suitable for contact with platelets without contaminating said platelets, the formulation further being capable of being extruded, blow-molded, and radiation sterilized, which comprises:
   a) from about 78 to about 82 percent by weight of a copolymer consisting essentially of ethylene and vinyl acetate units wherein the copolymer includes from about 25 to about 30 percent by weight vinyl acetate units;
   b) from about 14 to about 18 percent by weight of a block copolymer, the block copolymer consisting essentially of a central block copolymer molecule including ethylene and butylene units in about a 1:1 ratio, and terminal blocks of polystyrene wherein the block copolymer molecule includes from about 50 to about 85 percent by weight of the central block copolymer molecule; and
   c) from about 4 to about 6 percent by weight of an ultra-low density polyethylene material,
   d) the formulation being free of stabilizers and plasticizers.

2. A flexible, collapsible container for platelets capable of being radiation-sterilized made from a plastic formulation suitable for contact with platelets without contaminating said platelets, the formulation comprising:
   a) from about 78 to about 82 percent by weight of a copolymer consisting essentially of ethylene and vinyl acetate units wherein the ethylene-vinyl acetate copolymer includes from about 25 to about 30 percent by weight vinyl acetate units;
   b) from about 14 to about 18 percent by weight of a block copolymer, the block copolymer consisting essentially of a central block copolymer molecule including ethylene and butylene units in about a 1:1 ratio, and terminal blocks of polystyrene wherein the block copolymer molecule includes from about 50 to about 85 percent by weight of the central block copolymer molecule; and
   c) from about 4 to about 6 percent by weight of an ultra-low density polyethylene material,
   d) the formulation being free of stabilizers and plasticizers.

3. A method of housing platelets, the method comprising the step of enclosing the platelets in a container made of a flexible plastic formulation that is in contact with the blood and which is capable of being extruded, blow molded, and radiation sterilized which consists of:
   a) from about 78 to about 82 percent by weight of a copolymer consisting essentially of ethylene and vinyl acetate units wherein the ethylene-vinyl acetate copolymer includes from about 25 to about 30 percent by weight vinyl acetate units;
   b) from about 14 to about 18 percent by weight of a block copolymer, the block copolymer consisting essentially of a central block copolymer molecule including ethylene and butylene units in about a 1:1 ratio, and terminal blocks of polystyrene wherein the block copolymer molecule includes from about 50 to about 85 percent by weight of the central block copolymer molecule; and
   c) from about 4 to about 6 percent by weight of an ultra-low density polyethylene material;
   d) the formulation being free of stabilizers and plasticizers.

4. A flexible, collapsible container containing platelets, the container being capable of being radiation-sterilized and being made from a plastic formulation that is in contact with the blood and which consists of:
   a) from about 78 to about 82 percent by weight of a copolymer consisting essentially of ethylene and vinyl acetate units wherein the ethylene-vinyl acetate copolymer includes from about 25 to about 30 percent by weight vinyl acetate units;
   b) from about 14 to about 18 percent by weight of a block copolymer, the block copolymer consisting essentially of a central block copolymer molecule including ethylene and butylene units in about a 1:1 ratio, and terminal blocks of polystyrene wherein the block copolymer molecule includes from about 50 to about 85 percent by weight of the central block copolymer molecule; and
   c) from about 4 to about 6 percent by weight of an ultra-low density polyethylene material;
   d) the formulation being free of stabilizers and plasticizers.

5. A multi-layered laminate film for use in storing platelets including at least one layer made from a plastic formulation which comprises:
   a) from about 78 to about 82 percent by weight of a copolymer consisting essentially of ethylene and vinyl acetate units wherein the ethylene-vinyl acetate copolymer includes from about 25 to about 30 percent by weight vinyl acetate units;
   b) from about 14 to about 18 percent by weight of a block copolymer, the block copolymer consisting essentially of a central block copolymer molecule including ethylene and butylene units in about a 1:1 ratio, and terminal blocks of polystyrene wherein the block copolymer molecule includes from about 50 to about 85 percent by weight of the central block copolymer molecule; and
   c) from about 4 to about 6 percent by weight of an ultra-low density polyethylene material;
   d) the formulation being free of stabilizers and plasticizers.

6. A container for platelets constructed from a multi-layer plastic laminate which includes at least one layer made from a plastic formulation consisting of:
   a) from about 60 to about 94 percent by weight of a copolymer consisting essentially of ethylene and vinyl acetate units wherein the ethylene-vinyl acetate copolymer includes from about 25 to about 30 percent by weight vinyl acetate units;
   b) from about 5 to about 25 percent by weight of a block copolymer, the block copolymer consisting essentially of a central block copolymer molecule including ethylene and butylene units in about a 1:1 ratio, and terminal blocks of polystyrene wherein the block copolymer molecule includes from about 50 to about 85 percent by weight of the central block copolymer molecule; and
   c) from about 1 to about 8 percent by weight of an ultra-low density polyethylene material.

* * * * *